United States Patent [19]

Goodfellow

[11] 4,157,933
[45] Jun. 12, 1979

[54] TIRE TREAD MOLDING APPARATUS

[75] Inventor: Anthony G. Goodfellow, Maghull, near Liverpool, England

[73] Assignee: Dunlop Limited, United Kingdom

[21] Appl. No.: 822,887

[22] Filed: Aug. 8, 1977

Related U.S. Application Data

[62] Division of Ser. No. 579,424, May 21, 1975, Pat. No. 4,057,446.

[30] Foreign Application Priority Data

May 28, 1974 [GB] United Kingdom ............... 23575/74

[51] Int. Cl.² .............................................. B29H 17/04
[52] U.S. Cl. ................................. 156/414; 152/361 R; 264/326; 425/51
[58] Field of Search ............... 156/110 R, 123 R, 125, 156/128 R, 128 I, 129, 133, 394 R, 414, 415, 416-419; 264/326, 328; 425/43, 49, 51, 58, 392, 383, 403, 405 H, 577, 589, DIG. 44; 152/361 R, 361 EP

[56] References Cited

U.S. PATENT DOCUMENTS

| 1,405,470 | 2/1922 | Wheatley | 156/110 R |
|---|---|---|---|
| 1,657,835 | 1/1928 | Mather | 425/51 |
| 2,071,864 | 2/1937 | Myers | 156/110 R |
| 2,145,806 | 1/1939 | Schnedarek | 156/416 |
| 3,218,209 | 11/1965 | Travers et al. | 156/123 |
| 3,223,566 | 12/1965 | Niclas et al. | 156/123 |
| 3,484,900 | 12/1969 | Sands et al. | 425/393 |
| 3,837,986 | 9/1974 | Gorter et al. | 156/125 |
| 3,994,650 | 11/1976 | Nishimura et al. | 425/589 |
| 4,057,446 | 11/1977 | Goodfellow | 156/123 R |

FOREIGN PATENT DOCUMENTS 2179230 4/1973 France.
1293815 10/1972 United Kingdom
1378219 12/1974 United Kingdom.
1399917 7/1975 United Kingdom.

Primary Examiner—John E. Kittle
Attorney, Agent, or Firm—Stevens, Davis, Miller & Mosher

[57] ABSTRACT

In the moulding of the tread portion of a pneumatic tire the radially inner surface of the mould cavity is defined by the radially outer surface of an annular former of elastomeric material. The former is contracted, a breaker assembly is built onto it and it is allowed to expand to stress the breaker. In the mould the former is further expanded and is held in compression between mould parts and the breaker to withstand moulding pressure. The former may have inflatable pockets to throw the breaker edges into contact with tire sidewall reinforcements.

9 Claims, 6 Drawing Figures

TIRE TREAD MOLDING APPARATUS

This is a Division of application Ser. No. 579,424 filed May 21, 1975, now U.S. Pat. No. 4,057,446.

The present invention relates to the manufacture of pneumatic tires and more particularly to the manufacture of pneumatic tires by moulding processes such as described in our U.S. Pat. No. 4,057,446, issued Nov. 8, 1977, which is hereby entirely incorporated by reference for a clearer understanding of the present invention.

In U.S. Pat. No. 4,057,446 there is described a method of manufacturing a tire in which a tread and breaker portion of the tire is moulded in a tread mould containing an internal former. Thereafter the internal former is removed and the uncured tread portion is joined to sidewall portions which have similarly been moulded in external mould parts (using internal mould parts which have also subsequently been removed) and the assembly of tread and sidewall portions, still carried on their external mould parts, are cured to bond the portions together.

However, it is desirable that a breaker built in the usual way from filamentary (e.g. textile) plies should be in a stretched condition when the tire tread portion is moulded onto it and cured.

In U.S. Pat. No. 4,057,446 there is described a method of manufacturing a tire of the kind in which the axial width of the tread portion is greatly in excess of the gap between the beads, in which method concave sidewall portions are moulded on either side of the tread former while the former is still supporting the tread portion. With such a design of tire it would obviously be difficult, if not impossible, to remove a rigid former from the interior of the finished tire without damage to the tire.

According to one aspect of the present invention there is provided a former for use in moulding the tread portion of a pneumatic tire, the former comprising a solid or substantially solid annulus which is of greater axial length than radial thickness in radial cross-section and which is of an elastomeric material which will yield to permit the diameter of the former to be increased or diminished. By "substantially solid" is meant that the annulus may be slitted or incorporate small apertures to alter its behaviour during deformation, but such slits or apertures do not remove any substantial proportion of the material of the annulus which remains effectively a solid body.

The annulus is preferably provided with a formation or formations whereby it may be engaged by means arranged to contract and/or expand the annulus. In radial cross-section the annulus may be part of a generally T-shaped body, the stem of the T projecting radially inwardly of the annulus in the region of its central plane. The stem may be of enlarged cross-section at a position along its length spaced from the junction between the stem and cross-piece of the T to provide an anchor block or rib whereby the stem may be gripped to allow a radially inward pull to be exerted on the annulus when it is desired to reduce its diameter. The radially inward surface of the annulus may taper toward its central plane to provide conical or inclined surfaces engageable by correspondingly inclined surfaces of mould parts movable axially inwardly of the annulus from opposite ends thereof toward its center thereby to displace the annulus radially outwardly and enlarge its diameter.

When these two engaging means are combined in the same former the conical or inclined surfaces will be on opposite sides of the anchor block or rib.

In accordance with another feature of the invention the annulus may be provided at its axial ends with annular inflatable pockets adapted, on inflation, to project axially outwardly and radially inwardly with respect to the annulus. These pockets are provided to consolidate the ends of breaker plies with the sidewall reinforcement, and in use are arranged so that carcass reinforcement plies for the tread region of the tire can be laid on the radially outer surface of the annulus initially with their opposite edges wrapped around and tucked into the axial ends of the former, while the pockets are in an uninflated condition. When subsequently tire sidewall portions are placed in contact with the tread portion formed over the breaker the pockets are inflated to displace the breaker carcass ply edges away from the former and into contact with the sidewall portions. The former may be a layered structure comprising layers of elastomeric material of different hardness, the hardest being in the radially outer side.

In accordance with yet another feature of the present invention there is provided a method of manufacturing a pneumatic tire with the aid of a former as defined in any of the four immediately preceding paragraphs, the method comprising building or locating an annular, substantially inextensible breaker on the radially outer surface of the former, increasing the diameter of the former to stretch the breaker, locating the former with the breaker in a stretched condition thereon in a mould, moulding a tire tread portion over the stretched breaker on the radially outer surface of the former, locating or moulding tire sidewall portions in contact with the tread portion, curing the tire and removing the former from the interior of the cured tire.

The method preferably comprises gripping the former between jaws which move axially inwardly of the annulus toward one another and locate behind the anchor block of the former, the jaws being so shaped that when gripping the stem portion of the former they expose the radially outer surface of the former. The jaws are moved radially inwardly of the former to contract the former to a diameter less than that which it has in its unstressed condition. A breaker assembly, which may include a carcass reinforcement ply or plies and other components such as edge strips or fillers is now built or located on the radially outer surface of the former, after which the former is released from the jaws so that in resuming its normal diameter it tends to stretch and firmly hold the breaker.

In the subsequent tire moulding process the former, with the breaker mounted thereon is again gripped by parts of the mould similar in shape to the jaws and having inclined surfaces which co-operate with those of the former to produce an expansion of the former beyond the diameter it has in its unstressed condition, thereby further stretching the breaker.

In this position the former is surrounded on all sides except its radially outer surface by parts of the mould and is in compression between mould parts and the breaker and is therefore sufficiently rigid to withstand moulding pressure when a tread portion for the tire is now moulded over the stretched breaker in a mould cavity of which the radially outer surface of the breaker carried on the former is a part.

The method may include wrapping opposite edges of carcass plies around the axial ends of the former with pockets at said axial ends in an uninflated condition and, subsequent to forming the tread over the breaker and to forming or providing sidewall portions of the tire in contact with the tread portion but prior to curing the tire, inflating the pockets to displace the carcass ply edges into contact with the tire sidewalls.

Preferred embodiments of the invention will now be described with reference to the accompanying drawings, in which.

Figure 1:
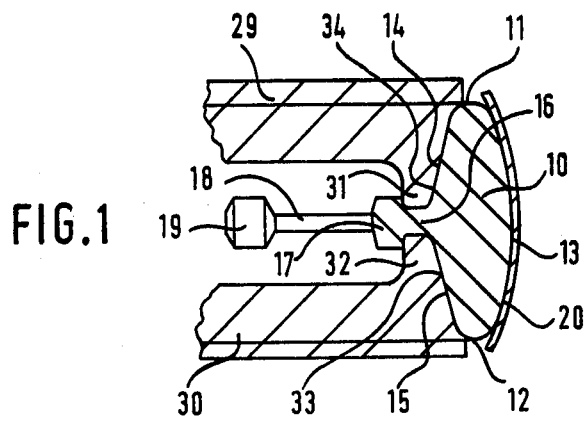
FIG. 1 is a radial cross-sectional view of a former in accordance with the invention shown as gripped by jaws on its opposite sides, the view being taken on the line 1—1 of FIG. 2.
Figure 2:
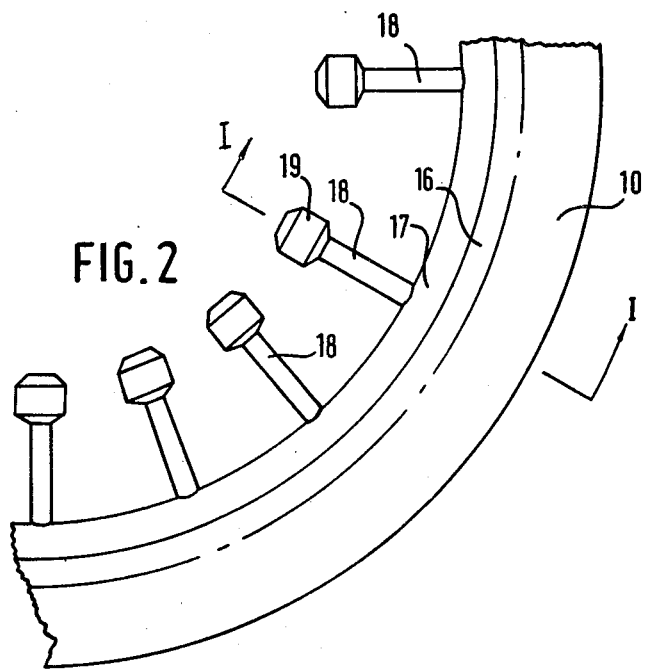
FIG. 2 is a partial plan view of the former of FIG. 1 with the jaws removed.
Figure 3:
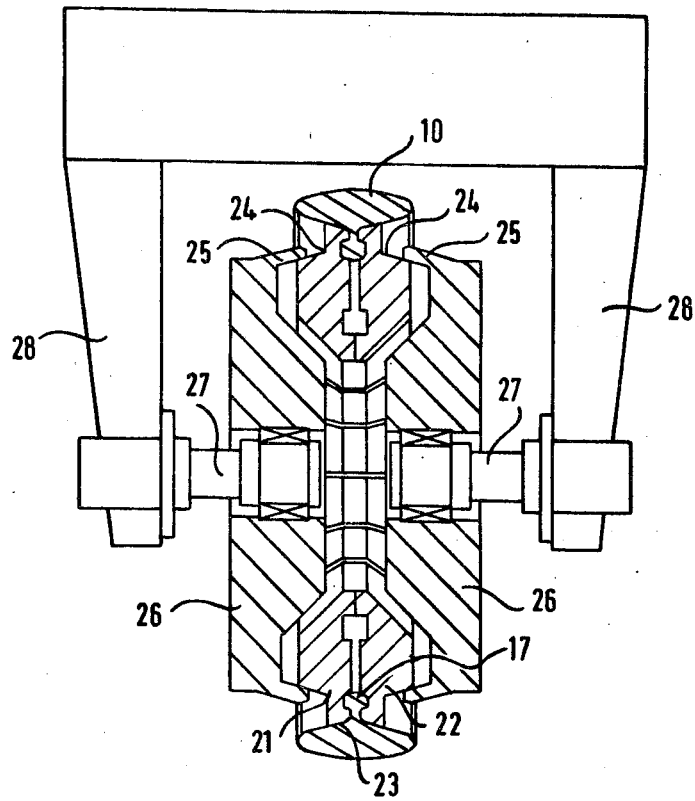
FIG. 3 is a sectional elevation of the former of FIGS. 1 and 2 mounted on a machine for contracting the former.

The former 10 illustrated in FIGS. 1, 2 and 3 is an annulus of an elastomeric material having bulk and shear moduli such that the former has relatively high resistance to changes of volume but relatively small resistance to changes of shape. It will be seen that the radially outer part of the former is approximately of elliptical cross-section, being elongated in its axial direction with rounded ends 11 and 12, having a radially outer surface 13 which is a curve of large radius in the axial direction and having a radially inner surface which tapers toward its center so as to provide two inclined frusto-conical surfaces 14 and 15.

The former 10 is T-shaped in radial section, an annular stem portion 16 extending radially inwardly of the annulus at its center between the inclined surfaces 14 and 15. The inner end of the stem 16 is of enlarged cross-section to provide an anchor block or rib 17. Extension stalks 18 may be provided to extend radially inwardly from the step portion 16 and may terminate at their free ends in blocks 19. The purpose of the stalks 18, which may be of metal and which may be secured to the former 10 in any known suitable way, is to provide means whereby the former may be gripped to remove it from the interior of a finished tire if the structure of the tire is such that access cannot easily be had to the anchor block 17.

Prior to building or locating a breaker structure (tread reinforcement) indicated at 20 in FIG. 1 on the radially outer surface of the former 10 the diameter of the former 10 is reduced on the machine illustrated in FIG. 3. Segmented annular jaws 21 and 22 engage the stem and anchor block of the former 10 in corresponding grooves, the outer peripheral surfaces 23 of the jaws being shaped to conform to the inclined surfaces 14 and 15 of the former. Each jaw 21 and 22 also has an inclined surface 24 which co-operates with an inclined lip 25 of an associated hub 26. The two hubs 26 are mounted on respective, co-axial pneumatic or hydraulic rams 27 on arms 28 of the machine. When the rams 27 are actuated to move the hubs 26 toward one another the lips 25 rise over the surfaces 24 to displace the segmented jaws 21 and 22 radially inwardly and in view of the engagement of the anchor block 17 between the jaws 21 and 22 the diameter of the former 10 is correspondingly reduced.

Figure 5:
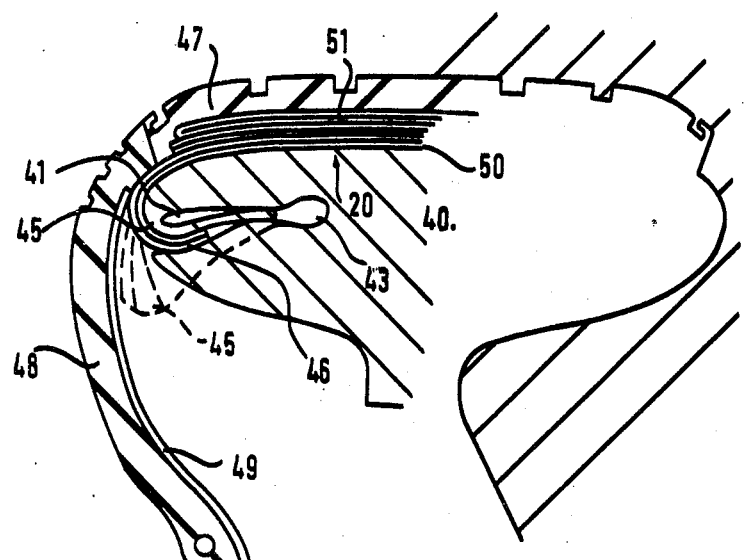
FIG. 5 illustrates the operation of placing the edges of carcass plies in contact with the tire sidewall by means of the former of FIG. 4.

With the former 10 in a reduced-diameter condition the breaker 20 is built or located on its radially outer surface 13. As illustrated in FIG. 5 the breaker assembly 20 includes a folded breaker 51 proper, and also a subjacent, two-layer carcass ply crown portion 50 which, in a radial tire, will be a 90° ply. The edges 46 of the carcass ply crown portion 50 are to be joined to carcass ply reinforcements 49 of the sidewalls of the tire, for example as described in U.S. Pat. No. 4,057,446. The carcass ply of the breaker assembly is a 90° ply, that is, at least the majority of the fibres or filaments forming this ply extend axially, rather than circumferentially, with respect to the former 10. The folded breaker plies are low-angle plies, i.e. plies in which the cords make angles of, say, 17° with the circumferential direction of the former.

After locating or building the breaker assembly 20 on the former 10 the diameter of the former is increased to stretch the breaker and maintain it tightly on the former. This can be done either by expanding the former or simply by removing the contracting force exerted by the machine illustrated in FIG. 3 so that the former stretches the breaker assembly 20 in tending to resume the diameter which it possesses in the unstressed condition.

The former 10 with the breaker assembly 20 in a stretched condition thereon is now located in a mould which includes platens 29 and 30 having the configuration generally as illustrated in FIG. 1. The platens 29 and 30 are moved toward one another axially of the former 10 so that their inwardly projecting lugs 31 and 32 engage the stem 16 behind the anchor block 17, the inclined peripheral surfaces 33 and 34 of the platens meanwhile engaging the inclined surfaces 14 and 15 of the former to tend to increase the diameter of the former 10 against the resistance of the breaker 20. In this way the former 10 is placed under a compression load and at the same time is supported on all surfaces except its radially outer one which forms part of the mould cavity for the tire tread portion.

Moulding of a tire tread portion onto the former 10 to incorporate the breaker 20 is carried out generally as described in U.S. Pat. No. 4,057,446 to which reference is made to. It will be noted that in view of the axially elongated shape of the former 10 the body of elastomeric material is relatively thin in the radial direction. The former 10 is fully supported by the members 29 and 30 and is in compression between the members 29 and 30 and the breaker assembly 20. These factors combine to ensure that the former 10 when located in the mould and immediately prior to the transfer of rubber into the tread forming cavity of the mould, has sufficient rigidity to resist the moulding pressure.

As described in U.S. Pat. No. 4,057,446 sidewall portions for the tire are separately moulded and joined to the tread portion, the tire is cured and thereafter the former 10 is removed from the interior of the finished tire. As described in our U.S. Pat. No. 4,057,446, however, the former may be suitably shaped to correspond with the internal shape of the tire and thus permits the removal of the members 29 and 30 after formation of the tread portion of the tire and their replacement by members which define with the radially inner surfaces of the former, cavities in which sidewalls for the tire are moulded in situ against the tread portion. In such a construction the sidewalls are concave and taper toward the beads which are nearly in contact. In the finished tire, therefore, the former is almost wholly enclosed and it is therefore vital that it should have little resistance to change of shape to permit its removal from the tire without causing damage to the latter. The shape of the former according to the present invention is such that although having sufficient rigidity when supported by the mould parts 29 and 30 it is sufficiently flexible and deformable to permit its subsequent removal from a finished tire without damage thereto.

Figure 4:
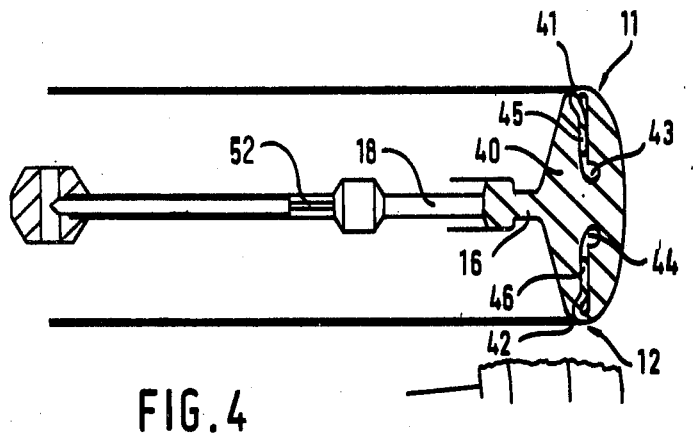
FIG. 4 is a radial section of a modified former.

The breaker assembly 20 will normally comprise a 90° ply in which the cords extend axially with respect to the former 10. A problem may arise in properly applying the edges of the carcass ply at the axial ends 11 and 12 of the former to the tire sidewalls or tire sidewall reinforcements. In accordance with another feature of the present invention illustrated in FIGS. 4 and 5 this problem is overcome by providing at the axial ends 11 and 12 of the former 40 annular pockets 41 and 42, respectively, formed by securing in axial slits in the former 40 the free ends 43 and 44 of membrane extensions 45 and 46.

The openings of the slits in the former 40 at the ends 11 and 12 of the former provide nips under the membranes in which the opposite edges of the carcass ply can be inserted to hold them in position during tread moulding and during the joining of uncured sidewall portions to the moulded tread portion. FIG. 5 illustrates the use of the pockets 41 and 42 subsequently to apply the carcass ply edges to the sidewall reinforcements.

As illustrated in FIG. 5 the tire tread portion 47 is moulded on the former 40 so as to incorporate the stretched breaker 20. At this stage the edges 46 of the 90° carcass ply are engaged in the nip at the opening of the slit in the former where the reversely folded membrane 45 forms the pocket 41. This engagement of the ply in the nip assists in preventing displacement of the ply during the moulding of the tread portion 47.

In a subsequent moulding operation, as described in our above-mentioned U.S. Patent No. 4,057,446, an uncured sidewall portion 48 (see FIG. 5) having an internal reinforcement 49 is moulded and applied to the tread portion 47. At this stage, before curing of the contiguous tire parts 47 and 48, the pockets 41 and 42 are inflated with air under pressure. The necessary ducting in the former 40 to permit the introduction of pressurized air into the pockets 41 snd 42 is not illustrated in FIGS. 4 and 5 but it will be understood that suitable axial and radial bores are formed in the former 40 communicating inlet pipe 52 co-axial with the stem 16 and stalk 18 with the pockets 41 and 42. The effect of inflating the pockets 41 is to displace the membrane 45 axially outwardly of the former 40 into engagement with the sidewalls 48. Because the radially outer surface of the former is held rigid by the breaker assembly 20 and the formed tread portion 47 in its cavity, and expansion of the membranes 45 axially of the former 40 is limited by the sidewalls 48, the membranes 45, as they emerge from the slits, tend to balloon radially inwardly of the former 40, deforming the radially inner lip of the slit to adopt the shape indicated by dotted lines in FIG. 5. By this means the ply edge 46 is displaced outwardly of the former 40 into contact with the reinforcement 49 of the sidewall 48. When the tire is thereafter cured the edges such as 46 of the carcass ply are bonded to the sidewall reinforcements, such as 49, to form an overlap joint and the former 40 is then removed from the interior of the finished tire.

Figure 6:
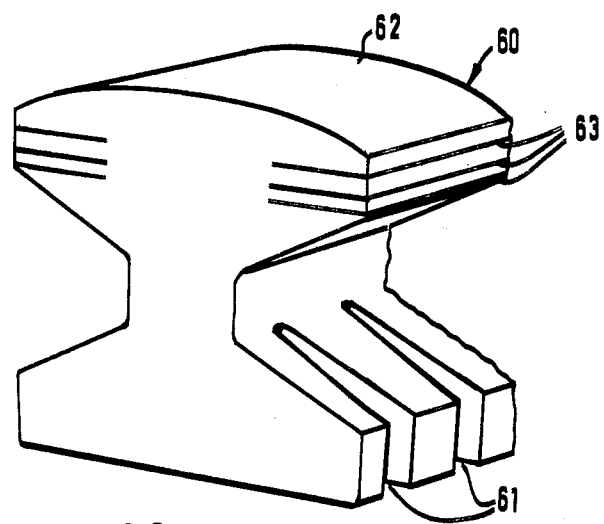
FIG. 6 is a perspective view of a section of a modified annular former in accordance with the invention.

To improve its capacity for radial expansion or contraction, the anchor block may be formed with circumferentially-spaced axially-extending slots 61, as shown on the modified former 60 illustrated in FIG. 6.

To improve its capacity for axial deformation under the pressure of the breaker and under moulding pressures without impairment of the resistance of the annulus 62 to radial compression the opposite axial ends of the annulus 62 may be formed with parallel slits 63 extending axially of the former. These slits 63 are of minimal extent radially of the former and the least possible former material is removed in making the slits 63.

Since the former 10, 40 or 60 is to remain within the tire during curing it should be of an elastomeric material having good heat resistance properties. It is also desirable that the former should have a suitable surface treatment, such as a baked-on silicone surface treatment, to facilitate release of the former from the interior of the completed tire.

The former may be restrained against axial elongation under the localized compressive forces which are generated during the introduction of uncured rubber into the mould cavity by wire or the like inextensible reinforcements (not shown) embedded in and extending axially of the former, e.g. 90° ply of steel tire cord, means being provided to fix the ends of each reinforcement relative to the ends of the former.

This fixing means may include or be constituted by inextensible circumferential annular reinforcements embedded in the axial ends of the former. These have the function of preventing radial expansion of the ends of the former while permitting radial movement of the central portion of the former. If the angle of taper of the inclined surfaces 14 and 15 is suitably chosen the effect of the closure of the platens 29 and 30 will be radially to expand the central area of the former without alteration of the diameter of its ends so that the radially outer surface of the former adopts the bowed configuration generally as illustrated in FIG. 1.

Having now described my invention, what I claim is:

1. Apparatus for molding the tread portion of a pneumatic tire, the apparatus comprising a solid or substantially solid annular former of elastomeric material without splits or channels therein, stretching means actuatable to increase the diameter of the former and supporting means engageable with the inner periphery of the former, the arrangement being such that after positioning an inextensible breaker structure around the former the stretching means is actuatable to expand the former, thereby placing the breaker structure is tension, and when subsequently the tread portion is molded onto the radially outer surface of the former over the tensioned breaker structure the supporting means supports the former against radially inward deformation under molding pressures.

2. Apparatus as claimed in claim 1, wherein the annular former is provided with an integral, radially inwardly extending formation engageable by the stretching means, the stretching means being actuatable to contract the former.

3. Apparatus as claimed in claim 1, wherein the annular former is T-shaped in radial section said formation comprising the stem portion of the T-shaped section.

4. Apparatus as claimed in claim 1, wherein the former is of an elastomeric material having bulk and shear moduli such that the former has relatively high resistance to changes of volume but relatively small resistance to changes of shape.

5. Apparatus as claimed in claim 3, wherein the stem of the T is of enlarged cross-section at a position along its length spaced from the junction between the stem and cross-piece of the T to provide an anchor block or rib whereby the stem may be gripped to allow a radially inward pull to be exerted on the former when it is desired to reduce its diameter.

6. Apparatus as claimed in claim 5, wherein the radially inner surface of the former tapers toward its central plane to provide conical or inclined surfaces engageable by the supporting means which comprises correspondingly inclined surfaces of mold parts movable axially inwardly of the former from opposite ends thereof toward its center thereby to tend to displace the former radially outwardly and enlarge its diameter.

7. Apparatus as claimed in claim 6, wherein the conical or inclined surfaces of the former are on opposite sides of the anchor block or rib.

8. Apparatus as claimed in claim 1, wherein the former is provided at its axial ends with annular inflatable pockets adapted, on inflation, to project axially outwardly and radially inwardly with respect to the annulus.

9. Apparatus as claimed in claim 1 wherein the former is in the form of a layered structure comprising layers of elastomeric material of different hardness, the hardest being at the radially outer side.

* * * * *